Aug. 5, 1930.  J. C. ALLEN  1,772,380
AUTOMOBILE SPRING COVER
Filed Jan. 25, 1929

John C. Allen INVENTOR
BY Victor J. Evans
ATTORNEY

Patented Aug. 5, 1930

1,772,380

UNITED STATES PATENT OFFICE

JOHN C. ALLEN, OF MERIDIAN, MISSISSIPPI

AUTOMOBILE SPRING COVER

Application filed January 25, 1929. Serial No. 334,998.

My present invention has reference to covers for springs, particularly to covers for laminated automobile springs held together by spring clips to prevent the separation due to rebound.

The primary object of the invention is the provision of a cover for this type of springs that comprises a main body of leather or like fabric, formed with pockets for the reception of the springs clips, provided on its inner face, at its ends and upon one of its sides with compressible strips or sheets for retaining a lubricant between the leaves of the spring and likewise for preventing the entrance of dust, moisture, etc., between the cover and springs, and further wherein the fabric body of the cover has secured on each of its edges, a metal plate which are designed to be arranged in lapping relation and to underlie the lower leaf of the spring which is subjected to the hardest strain or wear, and wherein the rounded outer edges of the metal plates afford surfaces for the gripping engagement of the hooked ends of coil springs which hold the cover on the vehicle spring.

To the attainment of the foregoing the invention consists in the improvement hereinafter described and definitely claimed.

Figure 1:
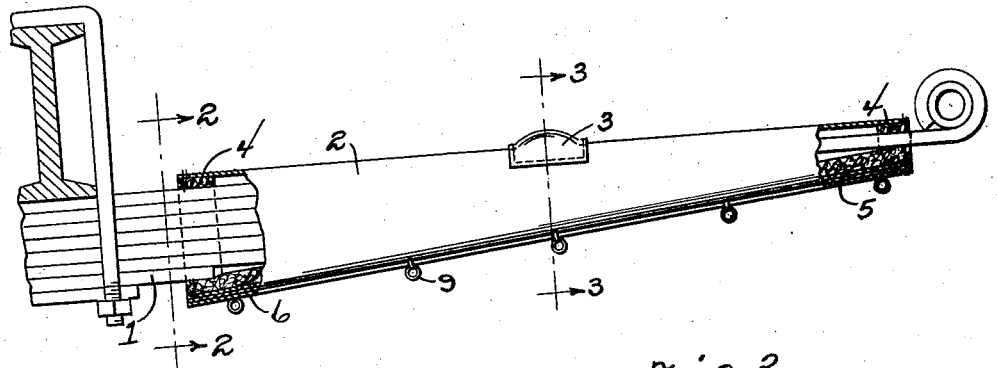
Figure 1 is a side elevation of a sufficient portion of an elliptical vehicle spring to illustrate the application of my improvement, parts of the same being in section.
Figure 2:
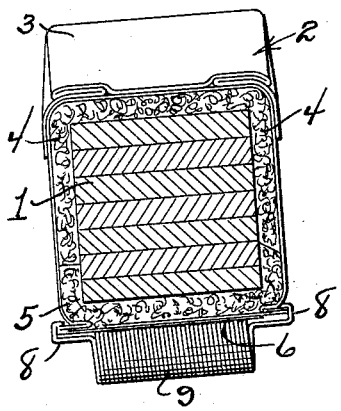
Figure 2 is a sectional view on the line 2—2 of Figure 1.
Figure 3:
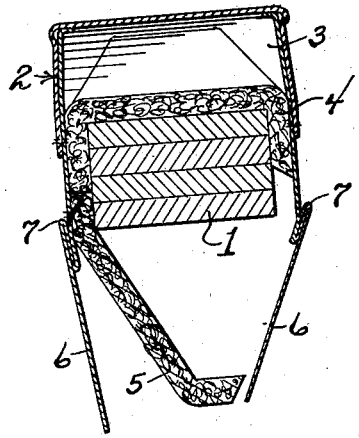
Figure 3 is a sectional view on the line 3—3 of Figure 1.

Referring now to the drawings in detail, the numeral 1 designates a sufficient portion of an elliptical spring of a vehicle spring to illustrate the application of my improvement thereon.

The spring is laminated, that is, the same is made up of a number of leaves.

My improvement essentially comprises a leather or like non-porous fabric cover 2 which, of course, is shaped to correspond with the shape of the spring 1. The cover on its top is formed with outstanding portions that provide inner pockets 3 for the clips of the spring 1. The top and the sides of the cover 2, at the ends thereof have stitched or otherwise secured thereon strips 4 of a thick compressible fabric, such as felt or the like. The strips 4 do not extend the entire length of the sides and one of the sides, in a line with one of the edges of the strip 4, has stitched thereto a strip 5 of similar material which is of a length to underlie the spring 1 and to contact with the edge of the strips 4, the said strip 5 being of a length equalling that of the cover 2.

Figure 4:
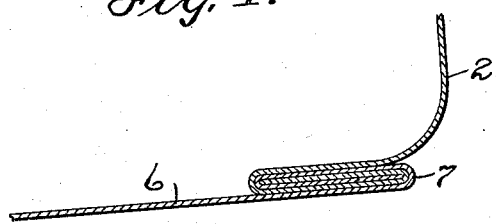
Figure 4 is a detail sectional view to illustrate the manner in which one of the metal or bottom plates is attached to the edge of the leather or like fabric body of the improvement.

The edges of the cover 2 are rounded upon themselves, as disclosed by Figure 4 of the drawings and in these rounded portions there are received the bent or rounded ends of metal plates 6, respectively. The rounded edges of the plates are for distinction indicated by the numeral 7. These plates are designed to be arranged in lapping relation when the cover is applied on the spring 1 and the rounded or beaded edges 7 thereof are adapted to be engaged by the hooked ends 8 of coil springs 9.

A device constructed as above described can be easily and quickly applied to cover the ends of an automobile spring. The felt elements 4 and 5 provide therebetween a pocket for sustaining a lubricant between the leaves of the spring 1 and likewise serve as means for preventing the entrance of dirt, moisture or the like into the cover. The metal plates 6, which form important elements of this invention, prevent the wrinkling of the leather or like fabric cover and the beaded edges thereof provide means whereby the hooks 8 of coil springs 9 may be easily and quickly attached thereto. This construction will permit of the use of any kind of lubricant. If the felt elements 4 and 5 are saturated with light machine oil before being applied on the springs, they will lubricate the spring leaves very satisfactorily; however, oil may be applied to the felt with a gun after the device has been installed on the springs. It is also to be noted that the pockets that provide the housings for the spring clips are formed each of a single piece of material.

Having described the invention, I claim:—

A cover for an arched laminated vehicle spring, comprising a leather body having pockets for the clips of the leaf spring and having its top and parts of its sides on the inner face and at the ends thereof provided with felt or like compressible strips, one of said sides, in a line with the edge of one of said strips having attached thereto another felt strip which is of a length equaling that of the cover and of a width to be arranged beneath the spring and to contact with the second edges of the first mentioned strips, the sides of the cover have their edges turned or rounded upon themselves, metal strips having turned or rounded outer edges which are in interlocking relation with the said edges of the cover, said metal plates designed to be arranged in lapping relation when the cover is applied on the vehicle spring and coil springs having hooked ends to engage with the outer rounded edges of the metal plates.

In testimony whereof I affix my signature.

JOHN C. ALLEN.